United States Patent [19]
Loucks et al.

[11] Patent Number: 5,634,122
[45] Date of Patent: May 27, 1997

[54] SYSTEM AND METHOD FOR MULTI-LEVEL TOKEN MANAGEMENT FOR DISTRIBUTED FILE SYSTEMS

[75] Inventors: Larry K. Loucks; Amal A. Shaheen, both of Austin, Tex.

[73] Assignee: International Business Machines Corporation, Armonk, N.Y.

[21] Appl. No.: 366,858

[22] Filed: Dec. 30, 1994

[51] Int. Cl.$^6$ .......................... G06F 13/376; G06F 12/06
[52] U.S. Cl. .......................... 395/608; 395/609; 395/610
[58] Field of Search .............................................. 395/600

[56] References Cited

U.S. PATENT DOCUMENTS

| | | | |
|---|---|---|---|
| 4,399,504 | 8/1983 | Obermarck et al. | 364/200 |
| 5,161,227 | 11/1992 | Dias et al. | 395/650 |
| 5,175,851 | 12/1992 | Johnson et al. | 395/600 |
| 5,261,069 | 11/1993 | Wilkinson et al. | 395/425 |
| 5,278,978 | 1/1994 | Demers et al. | 395/600 |

OTHER PUBLICATIONS

"Disconnected Operation in the Coda File System", Oct. 1991, Proceedings of the 13th ACM Symposium on Operating Systems Principles, Kistler et al.

*Primary Examiner*—Thomas G. Black
*Assistant Examiner*—Donald Min
*Attorney, Agent, or Firm*—Mark S. Walker

[57] ABSTRACT

A system and method for controlling access to shared resources in a distributed computer system. Access to shared resources is controlled by a local authorization token manager. Only computer processes holding authorization tokens for the requested operation may perform that operation. Each requested operation checks for the proper token. If the token is not held by the process, it is requested. The local token manager resolves token conflicts before granting tokens. A token manager of a distributed file system export protocol also is able to request authorization tokens from the local token manager. The export protocol token manager controls authorization tokens for that particular distributed file system protocol. Multiple different export protocols may request tokens from the local token manager. The shared resources may therefore be shared by multiple different export protocols without conflict. Local processes and processes requesting shared resource operations through an export protocol that does not itself manage tokens are granted tokens through the operation token request mechanism. This mechanism enables local processes to use shared resources without the performance penalty of having to request through a local distributed client process.

17 Claims, 9 Drawing Sheets

|  | Open_Read | Open_Write | Open_Exclusive |
|---|---|---|---|
| Open_Read 602 | Y | Y | N |
| Open_Write 604 | Y | Y | N |
| Open_Exclusive 606 | N | N | N |

N = Conflict
Y = Compatible

|  | lock_read | lock_write |
|---|---|---|
| lock_read 608 | Y | N |
| lock_write 612 | N | N |

MDFS token types: 702

Open token
Lock token 704
Stash token 706
Re-integrate token 708

SYSTEM AND METHOD FOR MULTI-LEVEL TOKEN MANAGEMENT FOR DISTRIBUTED FILE SYSTEMS

BACKGROUND OF THE INVENTION

1. Field of the Invention

The present invention relates to data management and, more specifically, to the management of data on a server shared by multiple users. Still more specifically, the present invention relates to the management of data management servers, possibly in a distributed environment, which supports multiple sets of clients, where each set of clients communicates with the server via a specific data management protocol. In addition, the present invention provides a mechanism for processes executing locally on the data server machine to access the same data.

2. Background and Related Art

Computer systems can consist of one or more computers. Distributed computer systems are created by linking a number of computer systems by a private communication mechanism, local area network (LAN), or wide area network (WAN). Each of the linked computers typically has a processor, I/O devices, volatile storage, and non-volatile storage. Certain ones of the computers are designated as "servers". A server provides services for one or more other computers which are labelled "clients". A server usually provides non-volatile (e.g. hard disk) data storage that can be shared by a number of computers. Servers may also provide shared processing resources and shared access to expensive peripherals such as high speed printers or scanners.

The sharing of data resident on a server or of devices has certain advantages for departments or workgroups with common data processing requirements. Data can be organized as file trees called "volumes" or "filesets". Files in the fileset can be accessed by local users on the server machine or by remote users on client machines. Access to files and directories in a file set are synchronized by the file system to avoid conflicting updates to the data and to ensure consistency of data read from the file system.

When files are accessed only by local users on the server machine, the central synchronization mechanism of the local file system is sufficient for synchronizing user access to files. Usually, only one user is allowed to have write (update) access to a byte range of a file, while multiple users can access the same data for "read". A "write" access blocks all "read" access to the data. Synchronizing access to shared data by remote users is a more complex problem.

The mechanisms for sharing files across a network has evolved over time. The simplest form of sharing allows a client to request data from a file server. The data is sent to the client processor and any changes or modifications to the data are returned immediately to the server. There is no caching of the data at the client. In this case, synchronization of access to the data is similar to the case of local users access.

Distributed file systems enhance file sharing by adding mechanisms to more effectively distribute data to clients and to more effectively control sharing of files. Many distributed file systems exist. Popular distributed file systems are the Network File System (NFS) from SUN MICROSYSTEMS INC. (NFS and SUN MICROSYSTEMS are trademarks of Sun Microsystems Inc.), Andrew File System (AFS) from Carnegie Mellon University (CMU) and the Distributed Computing Environment (DCE) Distributed File System (DFS) from the Open Software Foundation (OSF).

NFS allows client machines to cache data from server files, for read access, for a limited time (usually 30 seconds). During that time, users on the client machine can read the data from a local cache without communicating with the file server. All updates are propagated immediately to the server. Since the server does not keep records of which clients have cached data, there is no guarantee that the users on the client machine will have the latest data. However, since the window for reading stale cache data is small, this is usually satisfactory to most users and application programs.

AFS allows clients to cache data for both read and write access. The server keeps track of data cached by a client, say client A, and when a different client B requests access to the same data, the server sends a "callback" request to client A requesting return of the data.

DCE DFS allows client machines to cache data for read and write access. It uses a server-based token mechanism to synchronize access to the server data and ensure client cache consistency. Clients acquire "read" tokens to ensure that the data in their caches are valid. If a client is to change data in a file, it acquires a "write" token for the data. Granting a "write" token to one client invalidates the "read" tokens for all other clients. The token invalidation renders the cached data in these clients invalid.

As mentioned above, a distributed file system consists of a server and multiple clients. Clients communicate with the server according to a pre-defined protocol. The server "exports" volumes (sometimes referred to as file sets) residing on the local server machine for the remote client use. The server for a distributed file system synchronizes access by all of its remote clients to files in the volume it has exported.

The following problem arises when a volume is exported by a distributed file system and is accessed by local users on the server machine as well as by remote clients of the distributed file system: How to synchronize access to shared flies between those two sets of users? Different mechanisms are currently used. When an NFS server exports a volume, it does not actually guarantee cache consistency for its remote clients. As mentioned above, all updates from clients are propagated to the server. Thus, the server's local file system mechanism is used for access synchronization between all users: local and remote. AFS and DFS use a different approach: Since the AFS and DFS server guarantee cache consistency for their clients, direct access to exported volumes by local users on the server machine is not allowed. A distributed file system client (for AFS or DFS) must be installed on the server machine and local users must access exported volumes via this "local" client. This approach lengthens the response time for the local users, and increases the load on the server for the distributed file system.

A more complicated problem arises when the same volume (fileset) needs to be exported to clients of more than one distributed file system e.g. to both AFS and DFS distributed file systems. Both of those distributed file systems allow caching of server data on the client machines and server synchronization of access to the server files by its clients, but the different distributed file systems have different synchronization mechanisms. The problem is: how to synchronize access to shared files by all those diverse clients as well as the local users?

Existing distributed file systems do not currently provide a solution to problem. The only solution available is to export each volume to clients of no more than one distributed file system with cache consistency guarantees.

A still a more complicated problem arise when the protocol for one or more distributed file systems allows potentially disconnected clients. Such file systems are usually called "Mobile Distributed File Systems". (See "System and Method for Efficient Caching in a Distributed File System", Filed Mar. 7, 1994 and having U.S. Ser. No. 081,206,706 and also "Disconnected Operation in the Coda File System" by M. Satyanaranayanan, Carnegie Mellon University, *Proceedings of the 13th ACM Symposium on Operating Systems Principles*, October 1991). This scenario may arise in two possible cases:

1. When a client is connected to the server via a "wireless" network. Such networks are usually less reliable than wired networks with frequent intermittent disconnections; and
2. When a client caches data and then intentionally disconnects from the server. This is the case for users of portable computers who use their machines in the office (connected to the server) and in a remote location (at home, out of town, or on the road). While disconnected, the client reads, and potentially updates the cached data. Upon reconnecting with the server, the client propagates all the updates to the server.

The present invention also addresses the problems of synchronization between potentially disconnected clients and other users accessing the same fileset.

Thus, three technical problems exist: synchronizing file access by local and distributed clients without degrading local client access response time; synchronizing file access by multiple distribute file system protocols; and synchronizing file access by potentially disconnected clients.

SUMMARY OF THE INVENTION

The present invention is directed to providing a hierarchical control mechanism for synchronizing access to data files. This invention can be used by server machines for distributed file systems at a first level to synchronize access to files between protocol exporters of different distributed file systems and local processes. The distributed file system protocol exporters, in turn, can use the invention at a higher level to synchronize access by its clients to exported volumes. The client machines can also use the invention at a still higher level to synchronize access to cached files between different processes on the client machine.

The present invention is directed to a system for managing shared data in a data processing system, the system comprising: means for requesting authorization for a computer implemented process to perform an operation on shared data; means for managing requests generated by the means for requesting; and means for granting authorization tokens allowing an operation to be performed on the shared data, the means for granting being responsive to the means for managing.

It is therefore an object of this invention is to provide a synchronization mechanism for access of server files exported by one or more protocol exporter that is independent of any of the protocol exporters.

It is a further object to provide a system in which access to a file by a local process does not suffer a time penalty when the file has been exported by a distributed file system protocol exporter.

It is yet another object of the present invention to provide a token management synchronization mechanism independent of any distributed file system synchronization mechanism.

It is another object of the present invention to support disconnected clients by providing a new token type for allowing access to server files by a client in the stashing phase, for requesting reading of server files, and for getting ready to disconnect from the server with minimum disruption to other client or server local processes accessing the requested files.

It is yet another object of the present invention to support disconnected clients by providing new token types to support potentially disconnecting clients and re-integrating clients of Mobile Distributed File Systems and new token types to synchronize access to shared files after a client that was disconnected from the server re-connects and during the integration phase of client changes with the server files.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
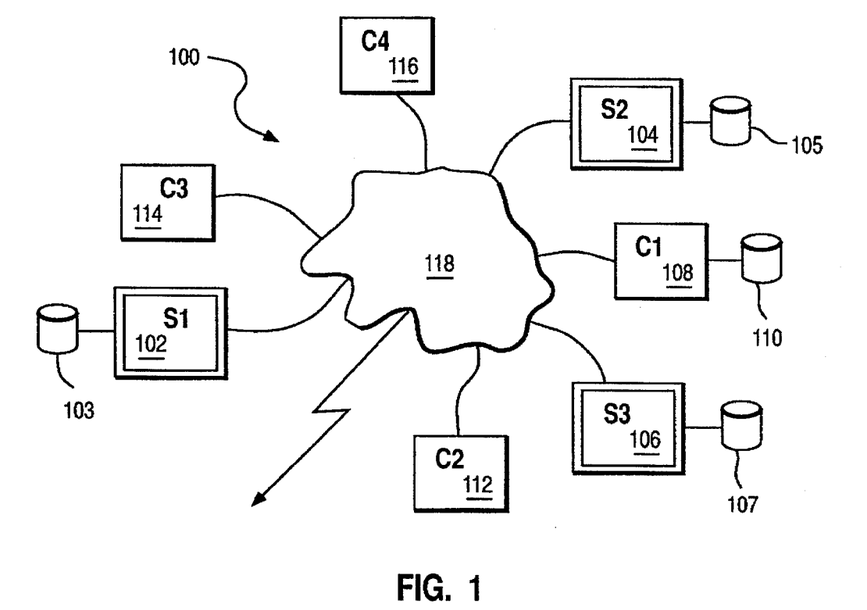
FIG. 1 is a block diagram illustrating a data processing system according to the present invention.

A data processing system according to the present invention is shown in FIG. 1. The overall clustered or distributed system 100 comprises a number of clients and servers interconnected by a network 118. Network 118 may be a local area network (LAN) serving a small business, corporate department, or similar entity, or it may include wide area network components interconnecting geographically dispersed sites. Network 118 may also be a private network, e.g. a high speed fiber optic connection or a switch connecting a cluster of machines. The present invention is applicable in all these cases.

Clustered or distributed system 100 includes servers 102, 104, and 106, each of which has non-volatile storage 103, 105, and 107. The non-volatile storage may be magnetic hard disks, optical disks, or similar technology. Each of the servers may have any number of each of these types of storage devices. Server systems typically contain large amounts of non-volatile storage having capacities exceeding one gigabyte.

Client workstations 108, 112, 114, and 116 are connected to the network and are able to use the services of one or more of servers 102, 104, and 106. A client may have its own non-volatile storage (e.g. 110) or may rely totally on a server for non-volatile storage.

The configuration of system 100, including the number and configuration of clients and servers, is provided only as an example and is not intended to limit the scope of the invention in any way.

Figure 2:
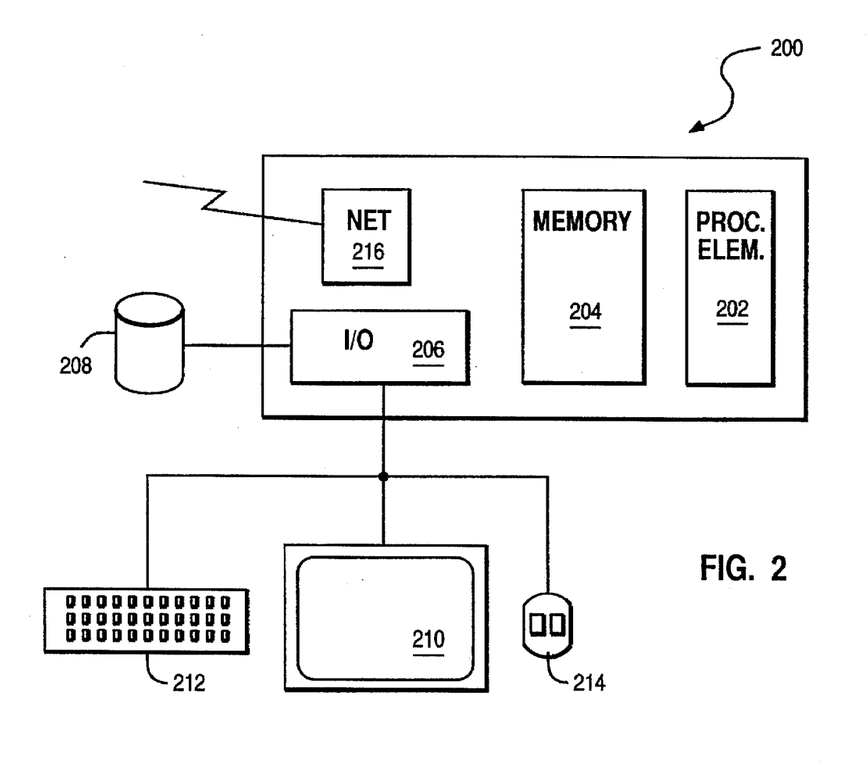
FIG. 2 is a block diagram of a typical server component of a data processing system according to the present invention.

The present invention is implemented within clients and servers in the network. The hierarchical token management mechanism is especially valuable in the servers. An example of a server as used by the present invention is shown in FIG. 2 generally at 200. A server can be any computer system such as an IBM PS/2 Model 95 or an IBM RISC System/6000 (IBM, PS/2 and RISC System/6000 are trademarks of the IBM Corporation.) Server 200 has one or more processors or CPUs making up a processor element 202. Processor element 202 has access to volatile memory 204. The processor also controls access to non-volatile storage, such as hard disk 208, and to input/output devices such as display 210, keyboard 212, and pointing device 214. Other I/O devices could be attached to an input/output unit such as a diskette drive, a CD-ROM drive and other multimedia devices. Network communication is handled by network controller 216. Network controller 216 performs the services necessary to control access to the network and other servers on the network. The physical network can be a Token ring, Ethernet, or any other network. The network protocol can be TCP/IP, Netbios, Netware, or another protocol allowing access to resources and transmission of messages over the network.

Implementation of the present invention is not dependent on client or server operating system, client/server protocol, network protocol, or physical file system. Thus, the present invention may be implemented in a heterogeneous environment where server operating systems may vary, e.g. being a mixture of AIX, OS/2 and other operating systems.

The present invention includes a computer system containing stored instructions for causing the computer processor to perform a novel process. These instructions can be stored in a non-volatile storage such as disk drive 208, or can be stored in a removable medium. The instructions cause the server to become configured in the manner necessary to implement the process of the present invention.

Figure 3:
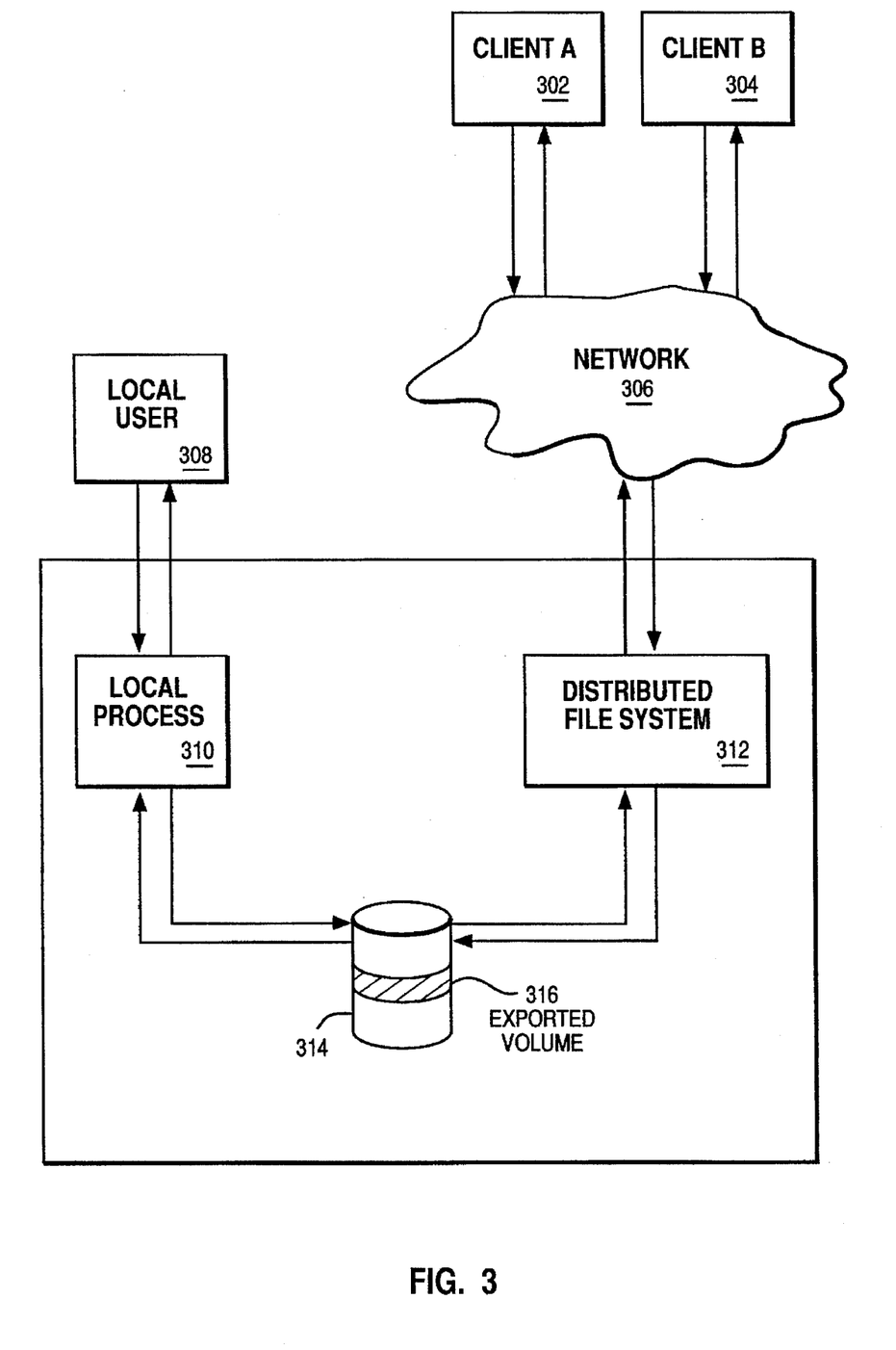
FIG. 3 is a block diagram illustrating access to a shared volume by local processes and clients of a distributed file system that exports the volume.

FIG. 3 is used to describe the components of a distributed file system that allow file sharing between local and remote processes. System 300 represents a server like the one described in FIG. 2. Server files are stored on a non-volatile hard disk 314. Files are usually organized in volumes or filesets such as 316. When a local user (308) requires access to a file on volume 314, a local process 310, executing on the server will start and access the file on behalf of the user 308.

Volume 316 can also be exported by distributed file system protocol exporter 312 so it can be accessed by file system clients 302 and 304. Client A and client B (302) and (304) are connected to the server by network 306 and access the exported volume using the exporting distributed file system protocol.

Figure 4:
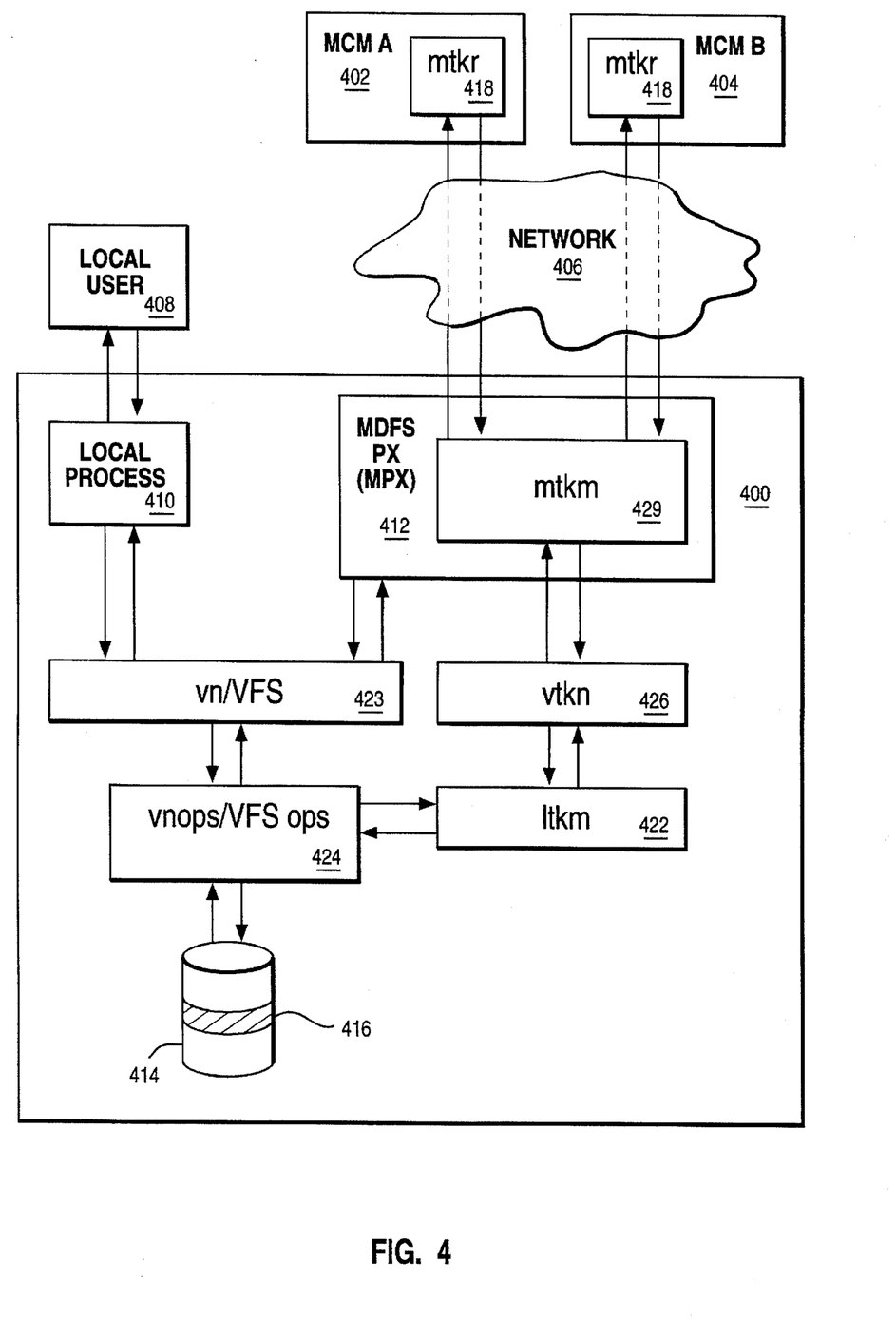
FIG. 4 illustrates the hierarchical token management mechanism of the present invention, as used by the Mobile Distributed File System Protocol Exporter (MDFS PX) and a local user.

FIG. 4 depicts the system software components used for hierarchical token management according to the present invention. Blocks 400, 402, . . . , through 416 correspond generally to distributed file elements 300 through 316 explained above in for FIG. 3. In FIG. 4, 412 represents the Protocol Exporter component of the Mobile Distributed File System (MDFS), the preferred embodiment of the present invention. Clients 402 and 404 are specifically Mobile Cache Managers (MCMs), i.e. clients of the MDFS.

mtkr (418) is a component of MCM called the "mobile token requester". Tokens represent an authorization for a process to perform a certain function, e.g. a "read" token permits a client to read data while a "write" token permits the client to update data. The function of token requester 418 is to request tokens, when needed, from the MDFS PX token manager's component mtkm 420 explained below. mtkr requests these tokens on behalf of its local users. It also maintains a list of the acquired tokens. When it receives a "token revoke" request from mtkm, it returns the required token to mtkm.

mtkm (420) is the mobile token manager for MDFS. The function of mtkm is three fold:

1. Request tokens from the local token manager, lktm 420 (explained below), on behalf of the MDFS clients, 2. Maintain a list of all the tokens acquired for its client.

3. Send "Revoke token" requests to clients when the specific token is requested by another MDFS client or by the local token manager.

Figure 7:
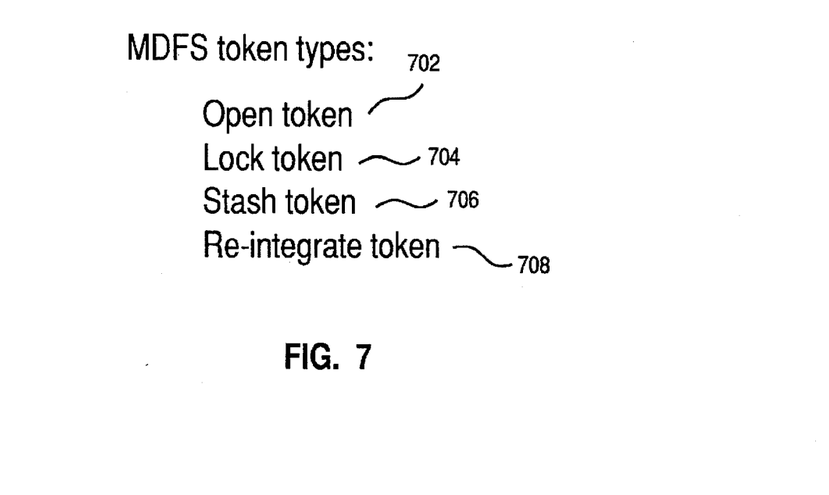
FIG. 7 illustrates new token types introduced by the present invention to support potentially disconnecting and re-integrating clients of Mobile Distributed file systems.

When the token requester, mtkr 418, of an MDFS client requests a token from the token manager 420, the token manager examines the list of tokens it holds on behalf of all its clients. Depending on the contents of this list, it may request a new token from the local token manager, request "revoke token" from one or more clients, or simply grant an available token to the requesting client. [The token types of the Mobile Distributed File System are illustrated in FIG. 7.]

In FIG. 4, the local token manager, lktm (422) synchronizes access to local files and filesets (volumes) by local processes and distributed file system protocol exporters. It performs the following functions:

1. Issues tokens to distributed file system protocol exporter token managers such as mtkm 420.

2. Maintains a list of all the tokens acquired for its users (mtkms and local users).

3. Issues "Revoke token" requests to the token managers of distributed file systems protocol exporters when the specific token is requested by another protocol exporter or a local user, and 4. Revokes a token given to a local user.

The vnode/VFS interface 423 represents a well defined interface in file systems based on the UNIX operating system file system. This interface represents files and volumes as separate entities, with each file being represented by a "vnode" and each volume by a "VFS". This interface isolates the users of files and file systems from the specifics of how files are stored on the local disk 414. Such specifics are implemented by the vnops/VFSops (424). The standard vnops and VFSops does not include any token management functions. In the present invention, the vnops/VFSops operations are divided into two categories:

—Functions that are not affected by tokens, and

—Functions that must be extended to support token management.

The second category includes functions such as open and lookup. [A list of such functions is provided below.] Those functions are extended to call the local token manager (lktm)

422, request a token, and provide the process id for the process that issues the vnode/VFS call. The lktm then checks the process id provided and the token requested against the list it maintains of tokens issued. If the requested token does not conflict with any other outstanding token, or is already being held by the same requesting process, then lktm grants the token. If the token has been previously granted to another process, then lktm revokes it first before granting it to the new requesting process. Specific token requests may cause revocation of multiple other tokens, e.g. request for an exclusive write token on a file requires revocation of all granted read tokens on that file.

The vtkn interface 426 is a new interface defined by the present invention specifically for token management. It is used by the token managers of distributed file system protocol exporters such as mtkm 420 or any other application that requires access to shared resource. For example, mtkm may explicitly request tokens on behalf of its clients by using the specific vtkn calls, e.g. when the requested tokens are not associated with any specific vnode operation, viz. a "stash" or a "re-integrate" token.

Figure 5:
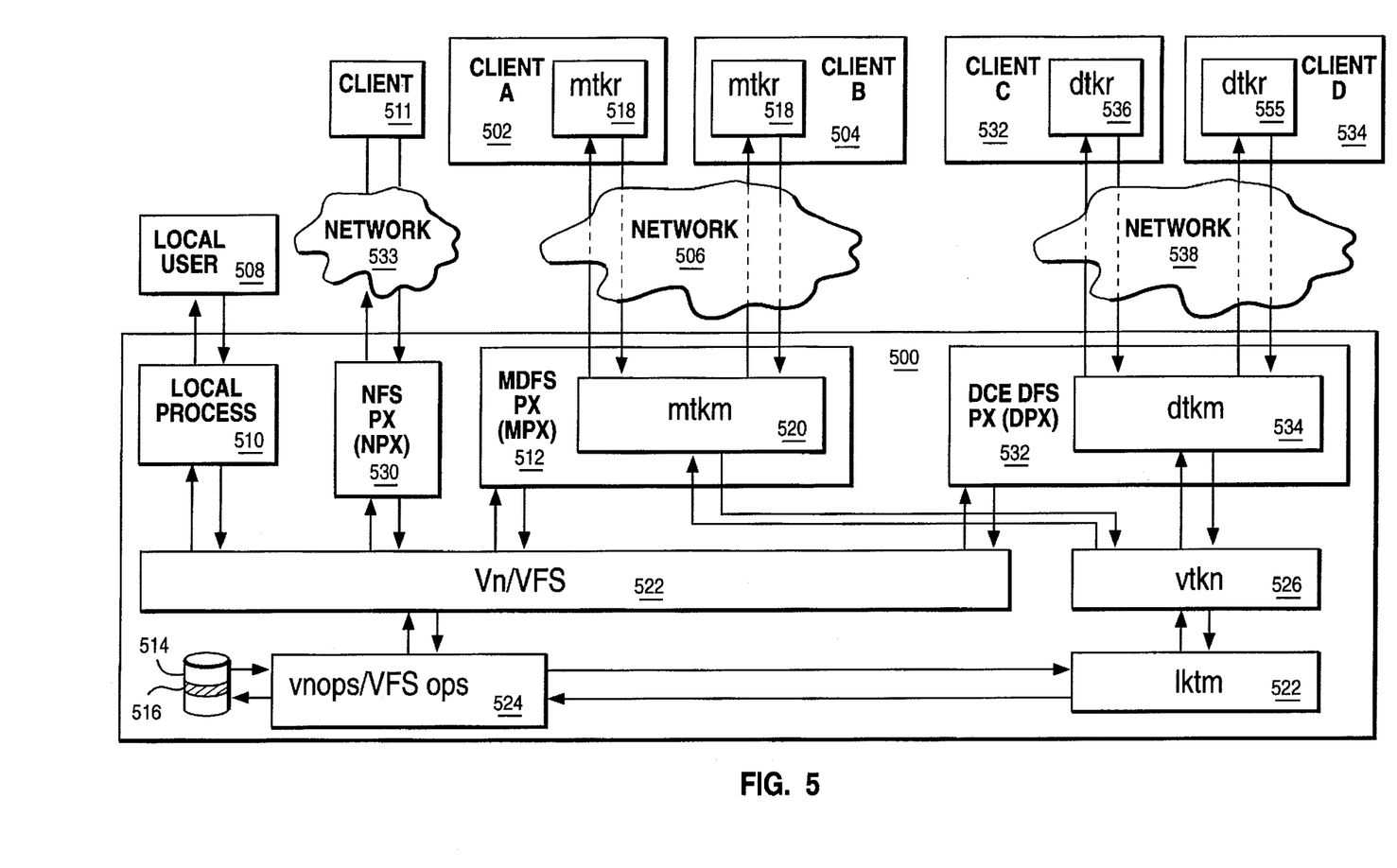
FIG. 5 illustrates the hierarchical token management mechanism of the present invention, as used when the volume is exported by more than one protocol exporter of a distributed file system, and is still being used by the local users.

FIG. 5 is used to describe the use of the present invention for sharing a volume on a file server when the volume is exported by multiple different protocol exporters as well as a local user. In this embodiment the volume is exported by the MDFS, NFS, and DCE DFS protocol exporters. The following description also explains the difference between protocol exporters that use tokens for synchronization (such as MDFS and DCE DFS) and protocol exporters with no token managers such as NFS and describes how such systems are supported by the present invention.

In FIG. 5, system 500 represents a server computer like the one described in FIG. 2. Server files are stored on a non-volatile hard disk 514. Files are organized in volumes or filesets such as 516. When a local user (508) requires access to files on volume 514, a local process 510, executing on the server will start and access the file on behalf of the user 508.

Volume 516 is exported by distributed file system protocol exporters 512, 530, and 532. The exporters may include a mixture of similar and different protocol exporters. Protocol Exporter 512 of the MDFS (Mobile Distributed File System) allows access to exporter volume by clients A and B (502 and 504) that communicate with 512 via network 506. Network 506 can be a wired or wireless network. Protocol Exporter 530 (NPX) of the NFS (Network File System) allows access to exporter volume by client E (531) that communicates with 530 via network 533. Protocol Exporter DPX (532) of the DCE DFS (DCE Distributed File System) allows access to exporter volume by clients C and D (532 and 534) that communicate with 532 via network 538.

mtkr (518) is the "mobile token requester" for MDFS. The function of 518 is explained in the detailed description of FIG. 4. dtkr (536) is the similar component in the DCE DFS. It is part of the DCE client cache manager (532 or 534) and it requests tokens, when needed, from the DCE DFS PX (DPX) token manager's component dtkm (536). dtkr requests these tokens on behalf of its local users. It also maintains a list of the acquired tokens. When it receives a "token revoke" request from dtkm, it return the required token as requested.

dtkm (534) is the distributed token manager for DCE DFS. The function of dtkm is equivalent to that of mtkm, explained is the description of FIG. 4. The single local token manager coordinates token grants to support vfsopns from the different export protocols and directly to the protocol token managers.

In FIG. 5, the local token manager, lktm (520) synchronizes access to local files and filesets (volumes) between local processes and distributed file system protocol exporters. It performs the functions listed in the detailed description of FIG. 4.

Description of the vnode/VFS interface 522, the vnops/VFSops (524), and the vtkn (526) is the same as FIG. 4.

In FIG. 5 volume 516 is also exported by the NFS PX (NPX) for use by the NFS client 531. NPX does not use explicit tokens to synchronize access to shared files by its clients.

The present invention classifies distributed file system protocol exporters (PXs) into two classes with respect to token management:

1. PXs that use explicit tokens for synchronizations:
   —Examples are MPX and DPX. Each of these protocol exporters supports a pre-defined set of token types.
   —The local token manager lktm supports the "union" of the above set.
   —The token managers, *tkm, of this class of protocol exporters explicitly request tokens from lktm.
2. PXs that does not use tokens for synchronization:
   —Such as NPX.
   —This class of PXs does not have a token manager. vn/VFS calls from these protocol exporters are treated as those from a local user. The modified vnops/VFSops (524) request tokens from the local token manager (lktm, 522) on behalf of these PXs. As in the case with local users, tokens for these PXs are revoked, when needed, by the lktm without "token_revoke" request to the protocol exporter.

Figure 6A:
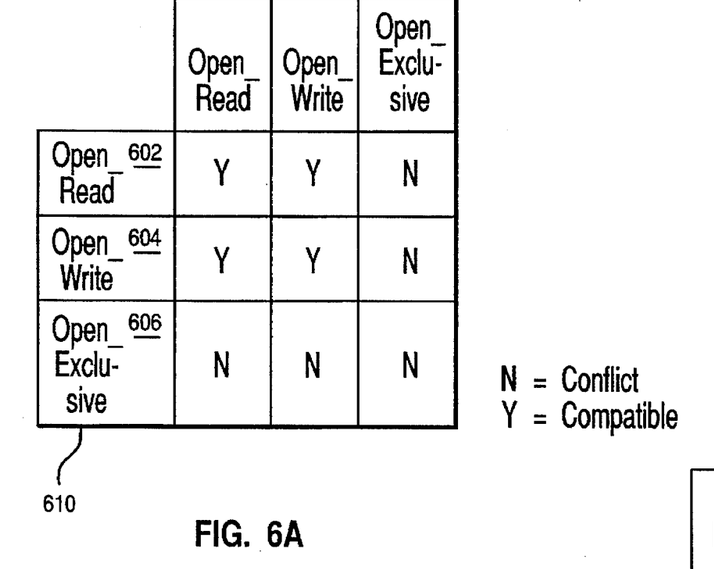
FIGS. 6a and 6b illustrate examples of the token types that may be used to synchronize access to shared resources in standard distributed file system with "always connected" clients.

FIG. 6 illustrates examples of the token types that may be required to synchronize access to shared resources in standard distributed file system with "always connected" clients. Two types of tokens are defined to support synchronization in these file systems:
   —Open Tokens
   —Lock Tokens Open Tokens: These are requested and granted for a volume (fileset) or for individual files in the fileset. There are three possible open tokens:
   Open_Read,
   Open_Write,
   Open_Exclusive The Open_Read 602 and Open_Write 602 are shared tokens, they can be issued to multiple clients of a token manager at the same time. The Open_Exclusive token can be given to only one client at any time, and it conflicts with other open tokens. The compatibility matrix 600 in FIG. 6a represents the compatibility relations between the open tokens.

A Protocol Exporter PX for a distributed file system requests Open_Read or Open_Write token for a file set when it "exports" the file set for read or wrote. A distributed file system client cache manager requests Open_Read or Open_Write token when it mounts (or imports) the fileset. The Open_Exclusive token is usually requested only by tools such as a repair or disk check utility. A PX for a distributed file system must acquire the appropriate fileset open token before it is granted any open tokens for individual files in the fileset. When a PX acquires an Open_Read token for a fileset, it can only acquire Open_Read token for files in the file set. When a PX acquires an Open_Write token or an Open_Exclusive for a fileset, it can acquire any Open token for individual files in the file set. This scenario also applies for cache managers of distributed file system clients.

Figure 6B:
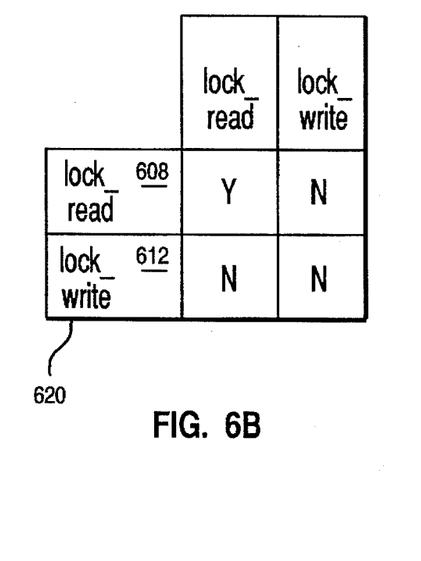

Lock Tokens: are requested (and granted) for a specific byte range in a file. A byte length of "zero" indicates a Lock token on the entire file. There are two possible Lock tokens: Lock_Read token 608 and Lock_Write token 612. The Lock_Read token is shared, while the Lock_Write token is exclusive and can only be held by one user of a token manager. The compatibility matrix 610 shows the compatibility relationships between the different lock tokens.

A user of the local token manager (ltkm) can acquire a lock token for a byte range in a file if it holds the appropriate open token on the file. To acquire a Lock_Read token, the user needs to have previously acquired any of the open tokens. To acquire a Lock_Write token, the user should have acquired an Open_Write or Open_Exclusive lock on that file.

FIG. 7 illustrates the token types used in the Mobile Distributed File System that support potentially disconnecting and re-integrating clients. In addition to the Open tokens 702 and Lock tokens 704, the present invention introduces two new token types to support the above clients: Stash token 706 and Re-integration token 708.

The Stash token is acquired for an entire fileset or for individual files. The stash token is a read-only shared token. It is requested by an MDFS client cache manager (MCM) to indicate this client's intention to disconnect from the server. The client MCM requests the Stash token from the Mobile Protocol Exporter MPX [See FIG. 5] for an entire fileset. MCM does not need to request stash tokens for the individual files in the fileset. MPX requests the Stash token on the fileset from the local token manager ltkm.

The Stash token on a fileset conflicts only with an Open_Exclusive token on the fileset. Thus, if the MPX 512 in FIG. 5 requests a stash token from ltkm 522 on fileset (volume) 516, and a local process 510 is holding an Open_Exclusive token on 516, the request from MPX is rejected by ltkm. The same scenario applies if the Stash token is requested by Client A 520, while an Open_Exclusive token is held by Client B 504.

Since requesting a Stash token indicates that the client is getting ready to disconnect and is probably in desperate need for files in that fileset, an option "as is" is defined to allow the client to get the files. The client can request the Stash token with the "as is" option. If an Open_Exclusive token for the fileset is being held by another client or by a local process on the server, it usually means that there is some repair operations on the fileset. The requesting client will get the stash token with a return code that indicate the fileset structure may be changing. Thus, a request for a Stash token with the "as is" option is always granted.

After Client A 502 acquire a stash token on a fileset, it issues file system calls: Open and read for the files it needs. The client in the stash mode, does not need to explicitly request Open_Read or Lock_Read tokens for the files. [This enhances performance.]

The Reintegration Token is a write token requested by a client MCM of MDFS when it reconnects with the server. It indicates that the client, while is was disconnected from the server, had changed the cached files and is requesting the capability to reintegrate the changes with the server's data.

FIG. 8 shows the operation of different levels of token managers and how they interact with each other. It is a flow charts representing the steps taken by a protocol exporter PX to export a fileset to its remote clients cache managers. The Mobile Distributed File System MDFS of FIG. 5 is used to demonstrate this process. The steps executed by the local token manager ltkm (522) and the mobile token manager mtkm (520) are shown in FIG. 8.

Figure 8A:
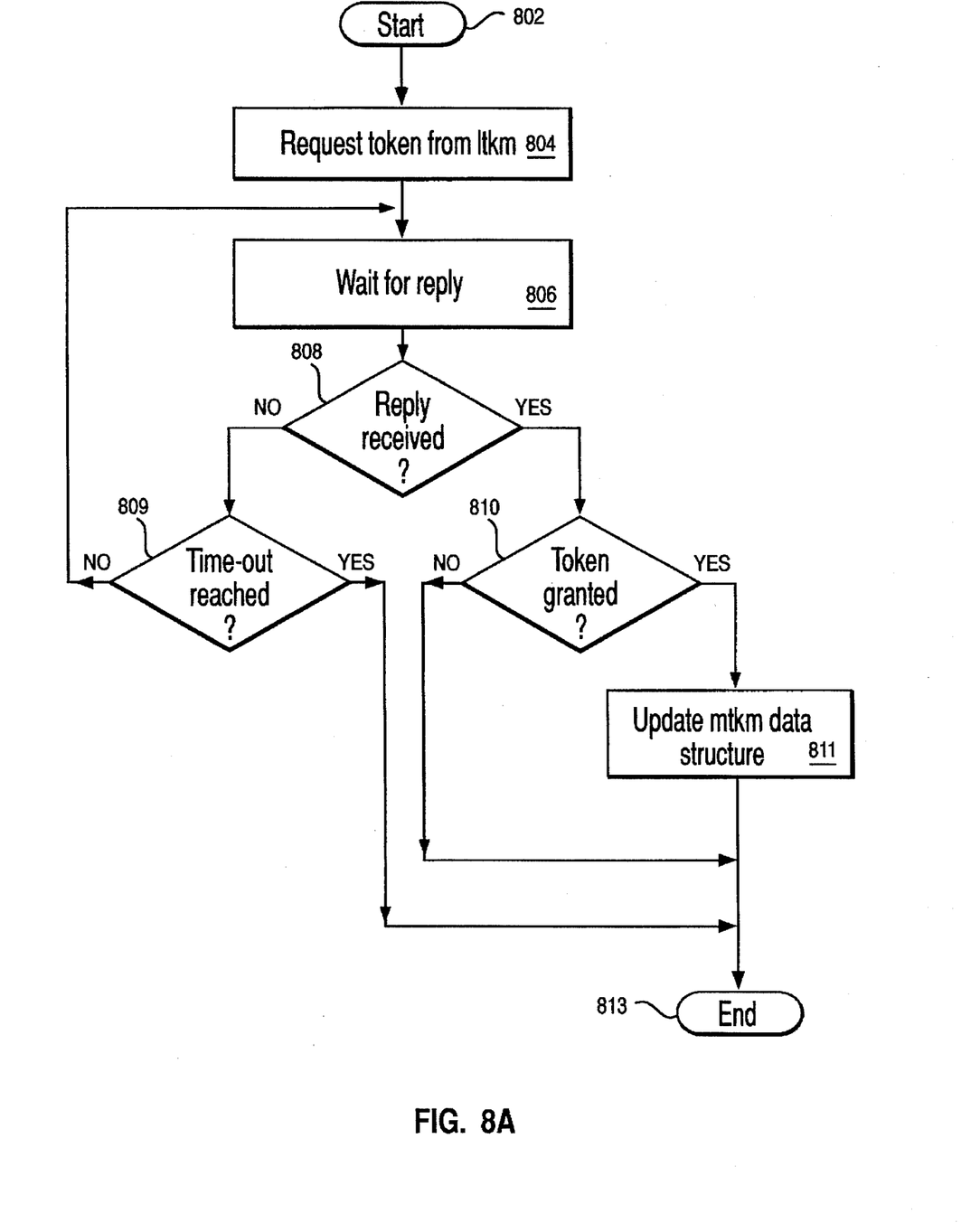
FIGS. 8a and 8b illustrate the hierarchical token management mechanism when used in a distributed environment where a fileset is exported by more than one distributed file system.

FIG. 8a shows the steps performed by the mobile token manager. mtkm starts execution (802) when the MDFS is started. To make a fileset y available for read and write access to its remote clients, mtkm must acquire an Open_Write token for y from the local token manager mtkm. Thus, mtkm requests this token (804) and waits for reply from ltkm (806). If no reply is received (N output for 808) and a pre-specified time-out is reached (Y output for 809), then mtkm ends the current request. If a reply is received (Y output for 808) then mtkm examines the reply (810). If the token request is denied, the operation ends (813). If the token is granted, mtkm updates its data structures to reflect holding an Open_Write token for fileset y (811) then ends the request (813). After the request is ended, mtkm is ready to start another request (if needed).

Figure 8B:
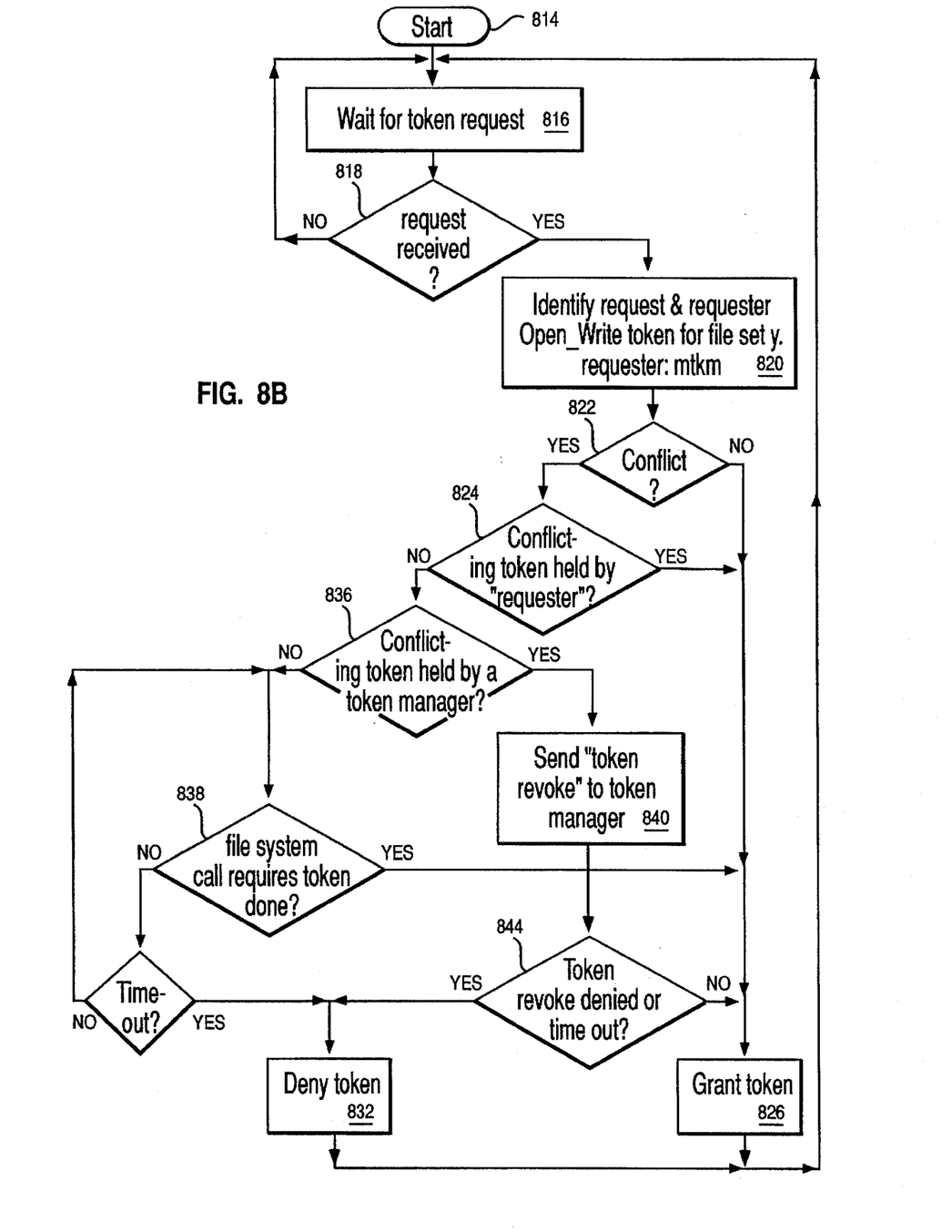

FIG. 8b shows the steps performed by the local token manager. ltkm starts execution (814), usually at the start up of the operating system. It initializes its data structures and waits for requests (816). When a request is received (Y output for 818), ltkm executes block 820 which identifies the request. This is a request discussed above for Open_Write token for fileset y. Since Open_Write token conflicts with Open_Exclusive token, ltkm examines its data structure for conflicting tokens granted (822). If an Open_Exclusive token has been previously granted to mtkm (Y output for 824), or if no such token has been previously granted (N output for 822), then ltkm grants the requested token (826). This involves updating its data structures to reflect the new token, and replying to the requester mtkm.

If an Open_Exclusive token is being held by a process other than mtkm (N output of 824), then ltkm start the "token revoke" process. To revoke a token, ltkm examines it data structures to identify the token holder (836). If the token holder is a token manager for a distributed file system such as dtkm (Y output from 836), then ltkm sends a "revoke token request" to dtkm (840). It then waits for reply, or times out (844). When a reply is received, that indicates the token is relinquished by its current holder (N out of 844), ltkm proceeds to grant the token (826). If no reply is received till time-out (Y output from 844), then ltkm proceeds to deny the current token request (832—explained below).

Now consider that the conflicting token is not held by a token manager of a distributed file system. In this case, the token has been requested by a local process on behalf of a local user, a system management tool, or a protocol exporter that does not support tokens such as the NFS protocol exporter NPX. ltkm will then waits for the operation that required the token to terminate (838). If done before a time out is reached, ltkm proceed to grant token, else (time out is reached) it proceeds to deny the token (832). Denying the current token request involves sending a "deny token request" to the process that originated the request, in this example, mtkm.

Figure 9A:
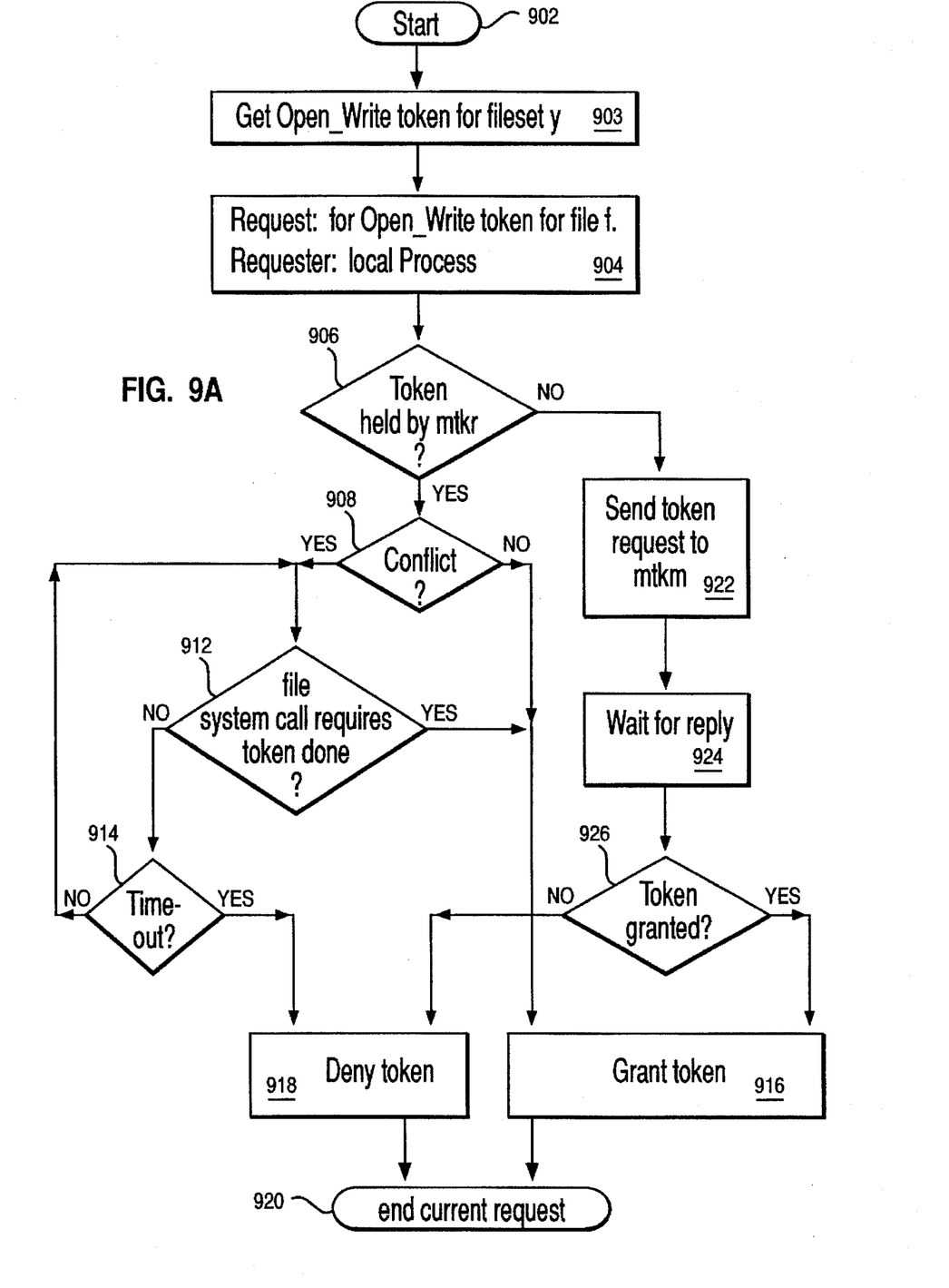
FIG. 9a and 9b are flow charts of the operations involved in accessing a shared resource by clients of the Mobile Distributed File System and, potentially, with local users or clients of other distributed file systems.
Figure 9B:
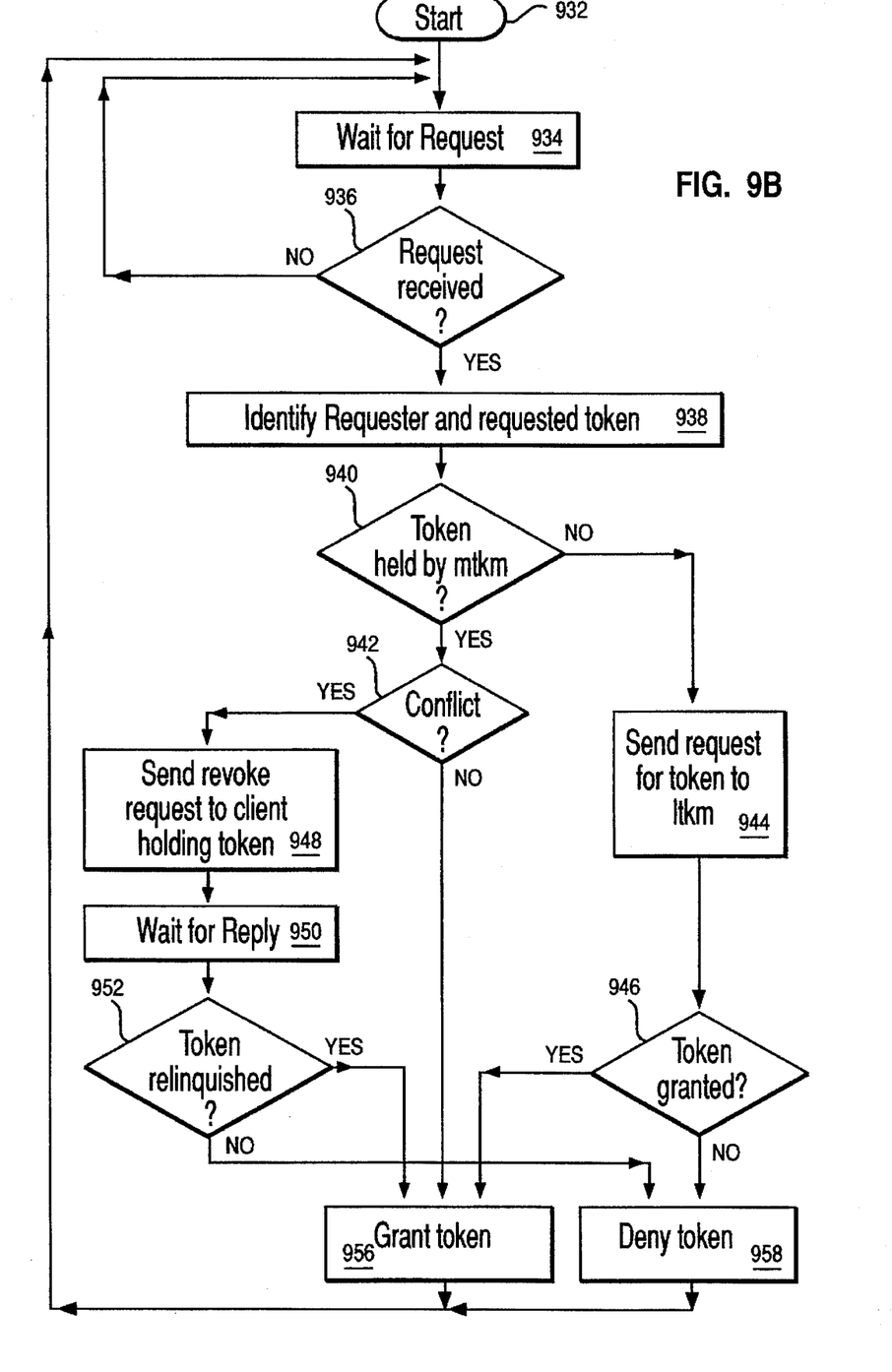

FIG. 9 describes multi-level of token management. This involves three levels of token requesters/token managers, and two levels of token request/revoke/grant. The mechanism described below can be extended to include more levels of synchronization using the present invention of token management. FIG. 9 is a flowchart representing the request for an "Open_write" token from a "token requester" of a client for an MDFS file system.

FIG. 9 represents the operations executed by the token requester at MDFS client A in FIG. 5. mtkr starts (902) when the distributed file system client code is started. It acquires read/write access to fileset "y" by acquiring an Open_Write token for fileset y (903). mtkr receives a request for Open_Write token (904) for file f, which reside in fileset y from a local process. Such a request is generated as a result of an "open file" system call issued by the local process or a local user. mtkr checks its data structure to verify if it has previously acquired this or a superseding token from MDFS token manager mtkm (906). If so (Y output from 906), it checks for conflicting tokens granted to local processes (908). A conflict (Y output from 908) arise if another local process has been granted a conflicting token with the one requested. In this case, mtkr waits for the file system operation that required the conflicting token to end or for time-out (912, 914). If time-out occurs (Y output of 914), then mtkr denies the current token request (918). Denying the token request involves sending a "reject token request" reply to the requesting process. If there is no conflict (N output of 908), or if the process holding the conflicting token ends its file system call (Y output of 912), then mtkr proceeds to grant the requested token (916). Granting a token involves updates to mtkr data structures and sending a "grant token request" to the requesting process.

If mtkr has not previously acquired the requested token (N output of 906), it sends an Open_Write token request to the MDFS server token manager mtkm (922) and waits for reply (924). If the reply was to grant the token (Y output of 926), then mtkr proceed to grant the token (916) as described above. If the reply from mtkm was to deny the token request or if time-out wad reached before a reply is received (N output of 926), then mtkr proceed to deny the token request (918) as described above. In both cases, this ends the processing of the current token request operation at mtkr.

FIG. 9b represents the steps executed by the mtkm. They are similar to those explained in description of FIG. 8, with the "Open_Write token" request for fileset y replaced by "Open_Write token" request for file f.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A system for managing shared data in a data processing system, the system comprising:

first means for managing requests for authorization for a computer implemented process to perform an operation on shared data generated by a first means for requesting according to a first file system protocol;

second means for managing requests for authorization for a computer implemented process to perform an operation on shared data generated by a second means for requesting according to a second file system protocol, said second means for managing including a second means for granting authorization tokens to a file system client in response to a client operation request;

first means for granting authorization tokens allowing an operation to be performed on said shared data, said means for granting being responsive to said first and second means for managing.

2. The system of claim 1, further comprising:

means for performing an operation on shared data, said means for performing including: means for testing for the presence of an authorization token from said first means for granting authorization tokens.

3. The system of claim 1, wherein said means for granting comprises:

interface means for accepting authorization token requests in a specified format; and local token management means for managing granted authorization tokens.

4. The system of claim 3, wherein said local token management means includes:

means for accepting an authorization token request;

means for testing said authorization token request to determine whether said request conflicts with tokens already granted;

means for granting said authorization request if no conflicts exists; and means for resolving request conflicts.

5. The system of claim 4, wherein said means for resolving comprises:

means for determining an identity of a computer implemented process previously granted a conflicting authorization token; and means for revoking said previously granted authorization token.

means for transforming said token request into a second format.

6. The system of claim 3, wherein said second means for managing comprises:

means for accepting an authorization token request in a first format;

means for transforming said token request into a second format compatible with said interface means; and means for sending a reformatted authorization token request to said first means for granting authorization tokens.

7. A method for controlling access to resources in a computer system having a processor, memory and a plurality of resources, the system having at least one distributed file system protocol exporter with a token manager using explicit authorization tokens for synchronizing file system operations of distributed file system clients, the method comprising the steps of:

restricting access to said shared resources to computer implemented processes having an authorization token for a requested operation on said shared resources;

receiving a request from a distributed file system token manager for a local authorization token for a shared resource;

granting a local authorization token if no conflicting tokens are outstanding, otherwise, resolving the conflicting tokens;

intercepting each request for an operation on said shared resources;

testing said request to determine whether said request is a request from a distributed file system protocol exporter using explicit authorization tokens;

requesting a local authorization token for said intercepted request, if said request is not from such a distributed file system protocol exporter;

granting a local authorization token if no conflicting tokens are outstanding, otherwise, resolving the conflicting tokens; and authorizing performance of said operation if said request has a granted local authorization token.

8. The method of claim 7, wherein said requests may originate from a plurality of different file system export protocols.

9. The method of claim 7, further comprising the steps of:

accepting by said distributed file system token manager of an authorization token request from a distributed file system protocol exporter client process;

testing said request against local authorization tokens held by said token manager and granting said request if a compatible token is held, resolving a conflict if a conflicting token is held, and requesting a token from if no token is held; wherein the step of requesting a token includes the steps of:

transforming the authorization request into a form required by said granting step; and sending a request for an authorization token to a next token manager.

10. The method of claim 9, wherein the next token manager is a local token manager.

11. The method of claim 7 wherein said authorization tokens include a "stashing" token and a "reintegration" token to support disconnected operations.

12. A computer program product having a computer readable medium having computer program logic recorded thereon for controlling access to managing shared resources in a data processing system that includes at least one distributed file system protocol exporter, said computer program product comprising:

first program product means for managing requests for authorization for a computer implemented process to perform an operation on shared data generated by a first program product means for requesting according to a first file system protocol;

second program product means for managing requests for authorization for a computer implemented process to perform an operation on shared data generated by a second program product means for requesting according to a second file system protocol, said second program product means for managing including a second program product means for granting authorization tokens to a file system client in response to a client operation request;

first program product means for granting authorization tokens allowing an operation to be performed on said shared data, said program product means for granting being responsive to said first and second program product means for managing.

13. The program product of claim 12, further comprising:

program product means for performing an operation on shared data, said program product means for performing including: program product means for testing for the presence of an authorization token from said first program product means for granting authorization tokens.

14. The program product of claim 12, wherein said program product means for granting comprises:

interface program product means for accepting authorization token requests in a specified format; and local token management program product means for managing granted authorization tokens.

15. The program product of claim 14, wherein said local token management program product means includes:

program product means for accepting an authorization token request;

program product means for testing said authorization token request to determine whether said request conflicts with tokens already granted;

program product means for granting said authorization request if no conflicts exists; and program product means for resolving request conflicts.

16. The program product of claim 15, wherein said program product means for resolving comprises:

program product means for determining an identity of a computer implemented process previously granted a conflicting authorization token; and program product means for revoking said previously granted authorization token.

17. The program product of claim 14, wherein said second program product means for managing comprises:

program product means for accepting an authorization token request in a first format;

program product means for transforming said token request into a second format compatible with said interface program product means; and program product means for sending a reformatted authorization token request to said first program product means for granting authorization tokens.

* * * * *